United States Patent
Arviv et al.

(10) Patent No.: US 6,621,877 B1
(45) Date of Patent: Sep. 16, 2003

(54) METHOD TO TRAIN A RADIO RECEIVER

(75) Inventors: Eli Arviv, Modi'in (IL); Eliezer Fogel, Herzlya (IL); Rafael Carmon, Holon (IL); Mark Shahaf, Ashdod (IL)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/355,158

(22) PCT Filed: Jan. 12, 1998

(86) PCT No.: PCT/IB98/00024
§ 371 (c)(1),
(2), (4) Date: Sep. 30, 1999

(87) PCT Pub. No.: WO98/34355
PCT Pub. Date: Aug. 6, 1998

(30) Foreign Application Priority Data

Jan. 30, 1997 (GB) ................................................ 9701956

(51) Int. Cl.⁷ .......................... H04L 27/06; H04L 27/14; H04L 27/22
(52) U.S. Cl. ....................... 375/316; 375/343; 375/364; 375/365; 370/321
(58) Field of Search ................................. 375/316, 343, 375/364, 365; 370/321, 347, 337, 442

(56) References Cited

U.S. PATENT DOCUMENTS

| | | | | | |
|---|---|---|---|---|---|
| 5,299,235 | A | * | 3/1994 | Larsson et al. | 375/365 |
| 5,303,226 | A | * | 4/1994 | Okanoue et al. | 370/442 |
| 6,337,855 | B1 | * | 1/2002 | Malkamaki | 370/347 |

* cited by examiner

*Primary Examiner*—Shuwang Liu
(74) *Attorney, Agent, or Firm*—Steven R. Santema; Valerie M. Davis

(57) ABSTRACT

A method to train a radio includes the steps of: in a radio (36), receiving a slot of information (2) containing at least an initial portion (4) containing training information (10), a second portion (5) containing training information (11), which second portion (5) is separated from the initial portion (4), and a concluding portion (6) containing training information (12), which concluding portion (6) is separated from the second portion (5). The method combining one of the initial portion (4) with the concluding portion (6a) of a previous slot of information (1) and the concluding portion (6) with an initial portion (4b) of a subsequent slot of information (3) to provide an at least one combined portion of training information. The method using the at least one combined portion of training information and the second portion of training information to train the radio.

20 Claims, 5 Drawing Sheets

METHOD TO TRAIN A RADIO RECEIVER

FIELD OF THE INVENTION

This invention relates to a method of training a radio of a Time Division Multiple Access (TDMA) communication system. The invention is applicable to a method of providing a training sequence to train the radio.

BACKGROUND OF THE INVENTION

In a Time Division Multiplex Access (TDMA) communication system, a communication channel is established having discrete time-wise subdivisions called slots which carry information. A typical channel experiences various types of interference. The interference can be "white noise", rising and fading in the received energy of the slot transmission caused by "multi path" reception of the slots (in which the receiver receives the same slot several times).

One way in which the effect of interference is alleviated is by the use of a training sequence which is transmitted in each slot. This sequence is compared with a known sequence held in memory at the receiver and the result of the comparison is used to compensate for the effects of the transmission channel.

There are several methods known in the art for estimation, error correction and detection and for recovery symbol timing. The common methods are maximum likelihood sequence estimation or soft decision forward error correction. The methods utilise the information in the training sequence received with the slot.

One commonly employed method of finding the maximum point of a symbol involves the correlation of a known training sequence and a received training sequence. When the channel has strong "white noise" or there is fading in the channel energy then the method will find at least two maximum points for the symbol. The method will then calculate the average value between the maximum points.

The disadvantage of that method is that location of the maximum point of the symbol is not accurate and causes an error in recovering the slot information.

This invention seeks to provide a method which mitigates the above mentioned disadvantages.

SUMMARY OF THE INVENTION

According to the present invention there is provided a method to train a radio. The method is carried out in the radio and includes the following steps. A slot of information containing at least an initial portion containing training information is received. Receiving a second portion containing training information, which second portion is separated from the initial portion. Receiving a concluding portion containing training information, which concluding portion is separated from the second portion. Combining at least one of the initial portion with the concluding portion of a previous slot of information and combining one of the concluding portion with an initial portion of a subsequent slot of information to provide an at least one combined portion of training information. Using the at least one combined portion of training information and the second portion of training information to train the radio.

The invention may be, typically, implemented in a Time Division Multiplex Access (TDMA) communication system. In a TDMA system, the information is transmitted in time slots and each time slot contains a first part of a training signal of a first type at the beginning of the slot, a second training sequence of a second or third type and a training sequence from the first type in the end of the slot and by using one of the combinations of the training sequence the symbol time recovery will be improved.

In the preferred embodiment of the invention, the step of receiving a slot of information containing at least an initial portion containing training information, a second portion containing training information, which second portion is separated from the initial portion, and a concluding portion containing training information, which concluding portion is separated from the second portion comprises the step of; receiving a slot of information containing at least an initial portion containing a first predetermined number of symbols of training information, a second portion containing a second predetermined number of symbols of training information, which second portion is separated from the initial portion, and a concluding portion containing a third predetermined number of symbols of training information, which concluding portion is separated from the second portion.

Preferably, the first predetermined number of symbols is 5, the second predetermined number is 11, and the third predetermined number is 6.

In the preferred embodiment of the invention, the step of providing an at least one combined portion of training information comprises the step of providing an at least one combined portion having a number of symbols of training information that is equal to the second predetermined number of symbols.

Preferably, the at least one combined portion has 11 symbols.

In the preferred embodiment of the invention, the step of using the at least one combined portion of training information and the second portion of training information to train the radio includes the step of comparing in a predetermined manner the second portion with the at least one combined portion.

In this manner, the second plurality of values that correspond to a calculated relationship between a correlation value and an energy value includes at least one plurality of values computed for the at least one combined portion.

In this manner, the second maximum value from amongst the second plurality of values includes at least one maximum value selected from at least one plurality of values of the second plurality of values.

A preferred embodiment of the invention will now be described, by way of example only, with reference to the drawing.

DETAILED DESCRIPTION OF THE DRAWINGS

Figure 1A:
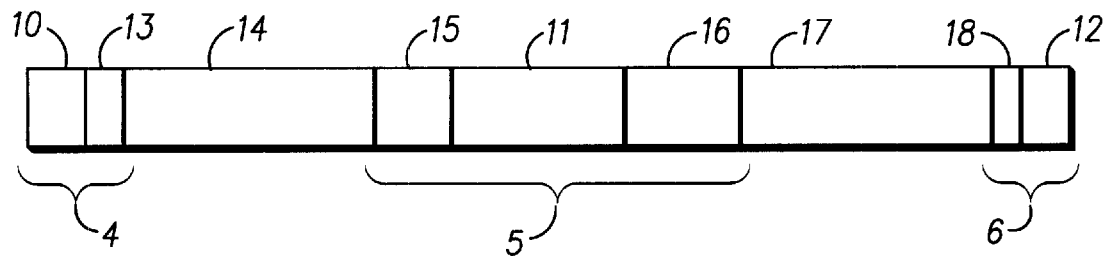
FIG. 1 is an illustration of a time slot structure of a time domain modulated communication system and a channel characteristic curve utilised in a preferred embodiment of the invention.
Figure 1B:
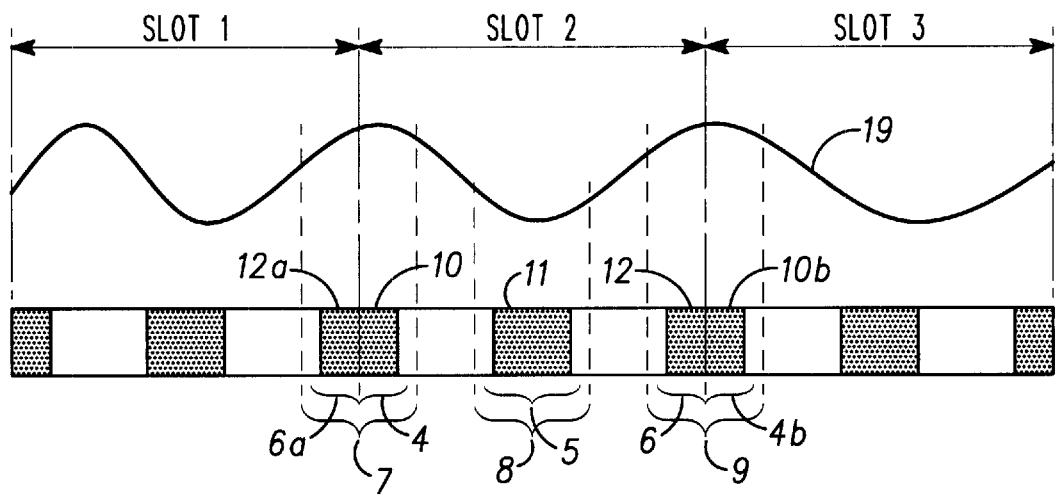

With reference to FIGS. 1*a* and 1*b*, a brief description of a time slot of information structure and a channel characteristic in a TDMA system (in this case it is a Trans European Trunked Radio system (TETRA)) will now be given.

FIG. 1*b* shows three consecutive slots in a TDMA system. Slot of information 2 is a present slot of information, slot of information 1 is a previous slot of information and slot of information 3 is a subsequent slot of information. Slots of information 1,2 and 3 have the same structure and only the structure of slot of information 2 will be described in detail with reference to FIG. 1A.

Slot of information 2 comprises the following portions. An initial portion 4 containing training information 10 and first phase adjustment bits 13. Second portion 5 containing a first scrambled block of bits 15, a training information 11 and a second scrambled block of bits 16. A concluding portion 6 containing training information 12 and second phase adjustment bits 18. The second portion 5 is separated from the initial portion 4 by a first block of data 14, and the concluding portion 6 is separated from the second portion 5 by a second block of data 17.

The slot of information 2 contains 510 bits which provide 255 symbols. The training information 10 of the initial portion 4 contains 6 symbols, the first phase adjustment bits 13 contain 1 symbol, the first block of data 14 contains 108 symbols, the first scrambled block of bits 15 contains 7 symbols, the training information 11 of the second portion 5 contains 11 symbols, the second scrambled block of bits 16 contains 7 symbols, the second block of data 17 contains 108 symbols, the second phase adjustment bits 18 contain 1 symbol and the training information 12 of the concluding portion 6 contains 5 symbols.

As is shown in FIG. 1*b*, a TDMA communication channel is characterised by a sinusoidal behaviour as is shown by a curve 19. FIG. 1*b* further shows the slots 1,2 and 3, and a "time window" 7 that contains a combination of the training information 10 from the initial portion 4 with training information 12*a* from the concluding portion 6*a* of the previous slot of information. A "time window" 8 contains the training information 11 from the second portion 5 and a "time window" 9 contains a combination of the training information 12 from the concluding portion 6 with the training information 10*b* from the initial portion 4*b* of a subsequent slot of information 3. Windows 7 and 9 provide a combined portion of training information from a first type and window 8 provides a training information of a second or third type as will described later.

Figure 2:
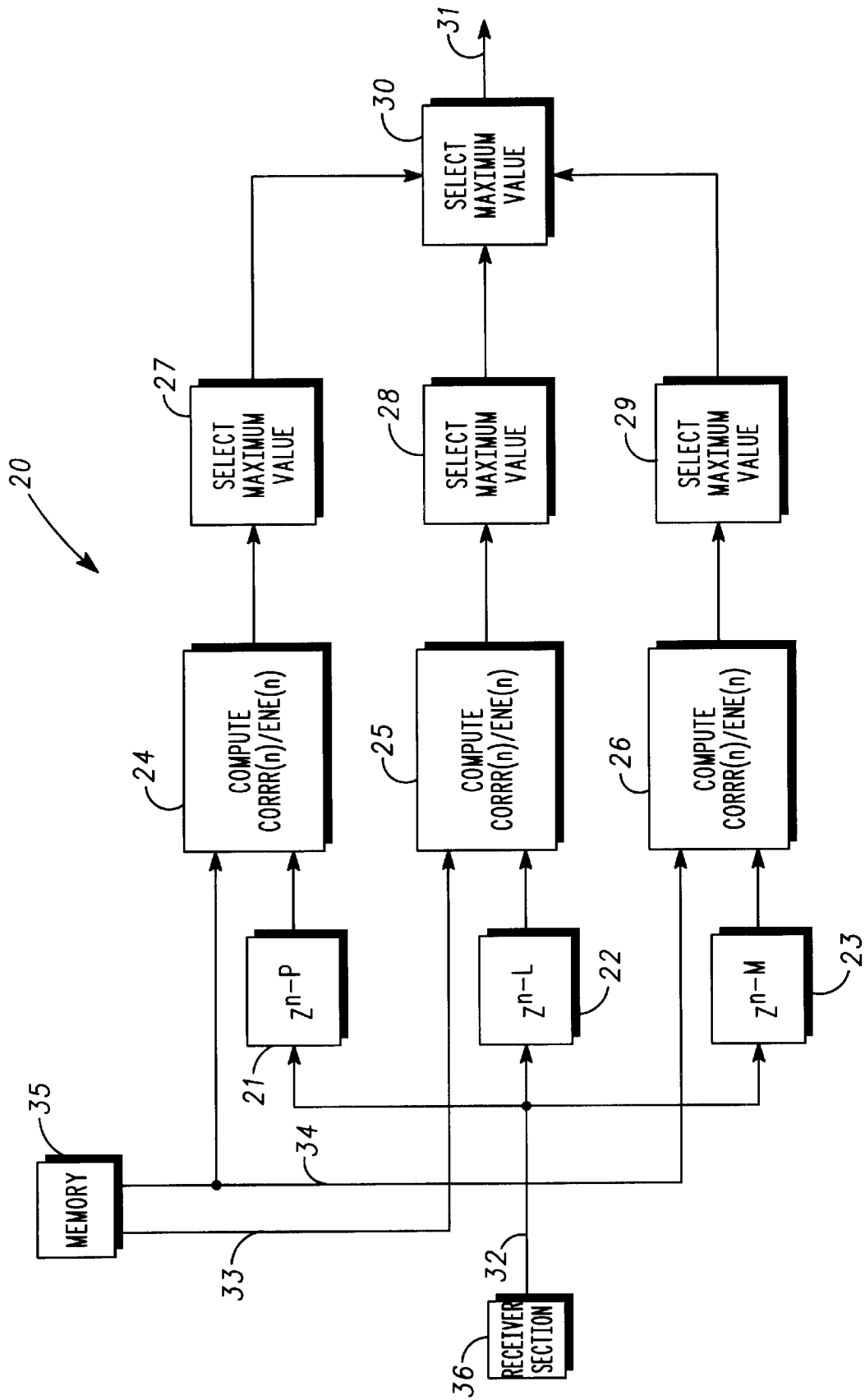
FIG. 2 is a block diagram of a symbol decoder of a radio receiver according to a preferred embodiment of the invention.

A symbol decoder 20 used in a radio operating on the TDMA system will now be described with reference to FIG. 2. The symbol decoder 20 comprises a memory 35 for storing the training sequences. The memory 35 has two outputs. A first output 34 is connected to a block 24 and to a block 26. A second output 33 is connected to block 25. Blocks 24,25 and 26 are used to compute a function Corr(n)/Ene(n). The function Corr(n)/Ene(n) will be described in more detail later.

The symbol decoder 20 further comprises time delay blocks 21,22 and 23. Inputs of blocks 21,22 and 23 are connected to a radio receiver section 36. Block 21 has an output connected to block 24, block 22's output is connected to block 25 and block 23's output is connected to block 26. Block 24 has an output connected to a block 27. Block 25 has an output connected to a block 28 and block 26 has an output connected to a block 29. Blocks 27,28 and 29 select the maximum value of a symbol and their outputs are connected to a block 30 that selects the maximum value of the training sequence symbol to train the radio.

Figure 3:
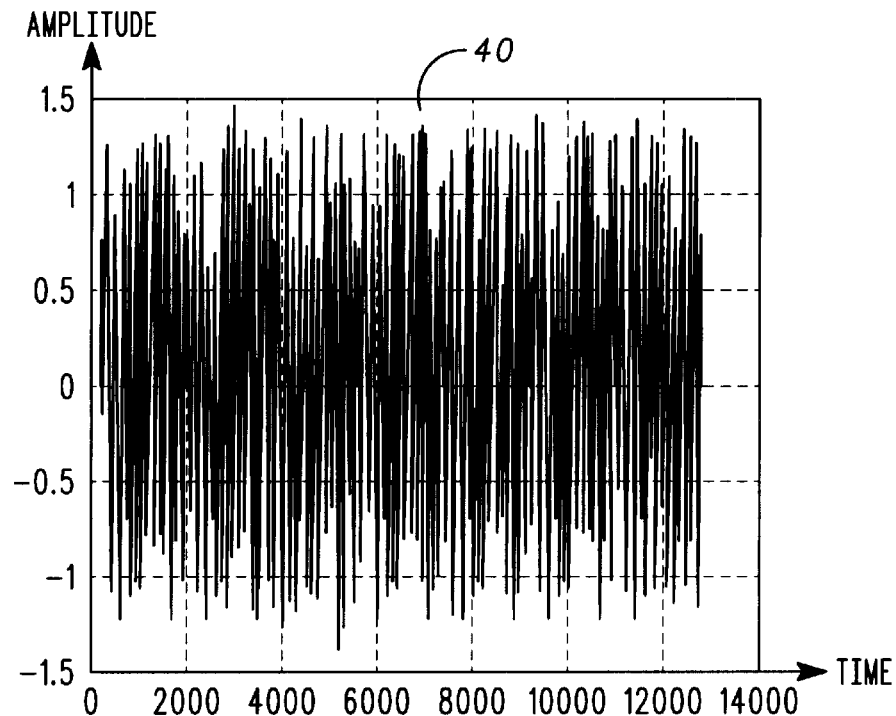
FIG. 3 is a curve showing a real part of an incoming signal to a radio receiver, according to a preferred embodiment of the invention.
Figure 4:
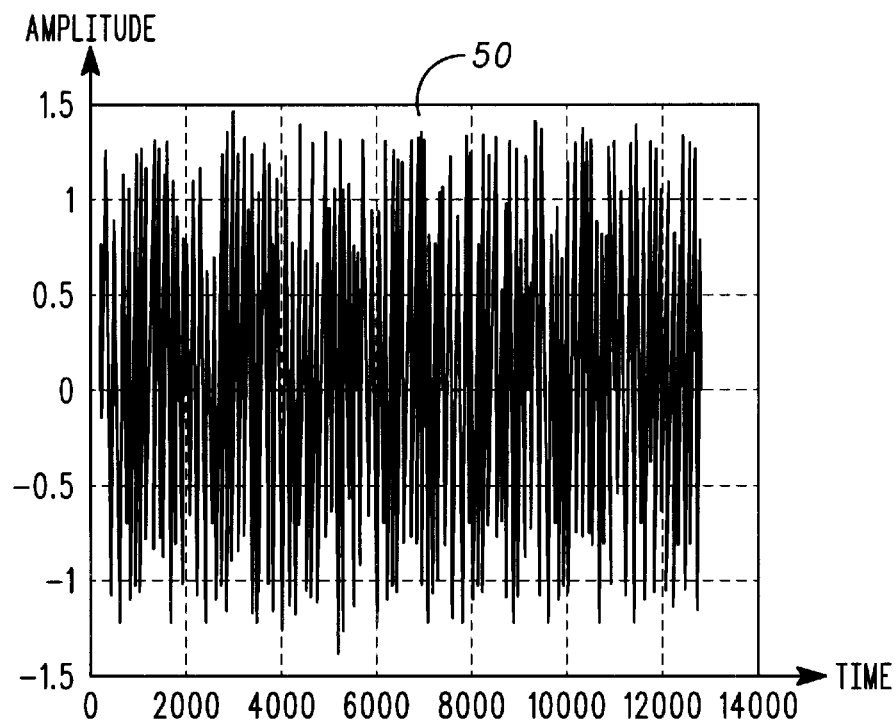
FIG. 4 is a curve showing an imaginary part of an incoming signal.

The operation of the symbol decoder 20 will now be described. An incoming signal will have a real and imaginary part Q and I respectively and the receiver is provided with a respective parts to cater for the signal parts respectively. An incoming signal 40 from the radio receiver Q part, as shown in FIG. 3, and an incoming signal 50 from I part as is shown in FIG. 4 are passed to the delay blocks 21,22 and 23. The delay blocks sample the incoming signals 40,50 and decode from them the training information. Delay block 21 samples the incoming signal in the time window 7, and therefor decodes the combined portion of training information. The combined portion is a combination of training information 10 from the initial portion 4 of the present slot, slot of information 2, with the concluding portion 6*a* of a previous slot of information 1. The delay block 21 outputs the combined portion of training information to block 24. The next delay block, delay block 22 samples the incoming signal in the time window 8, and decodes training information 11 of the second portion 5 of the present slot, slot of information 2. The delay block 22 outputs the training information 11 of the second portion 5 to blocks 25. The last delay block, delay block 23 samples the incoming signal in the time window 9, and decodes the training information of the combined portion of the concluding portion 6 having training information 12 with an initial portion 4*b* of a subsequent slot of information, slot of information 3, having training information 10*b*.

The delay block 23 outputs the combined portion of training information to blocks 26. A training information from a first type is entered from the memory 35 to blocks 24 and 25 and training information from a second or third type is entered from the memory 35 to block 25. The training information from the first type, the second type and the third type contains equal number of symbols, for example 11 symbols. For each symbol of the training information, blocks 24,25,26 calculate the correlation function and the energy function. The functions will be described below.

$$Corr(n) = \left(\left|\sum_{k=0}^{L-1} R(n-k*M)*S*(k)\right|\right)^2 \quad -N*M \leq n-\tilde{n} \leq N*M$$

$$Ene(n) = \sum_{k=0}^{L-1} R(n-k*M)*R*(n-k*M) \quad -N*M \leq n-\tilde{n} \leq N*M$$

Where $L$ - is the training information length $R(n)$ - incoming samples $S(k)$ - Training information.

$\tilde{n}$ - expected training information sequence center.

$M$ - Number of samples per symbol.

$N$ - Number of symbol in the interval search for peak location.

Figure 5:
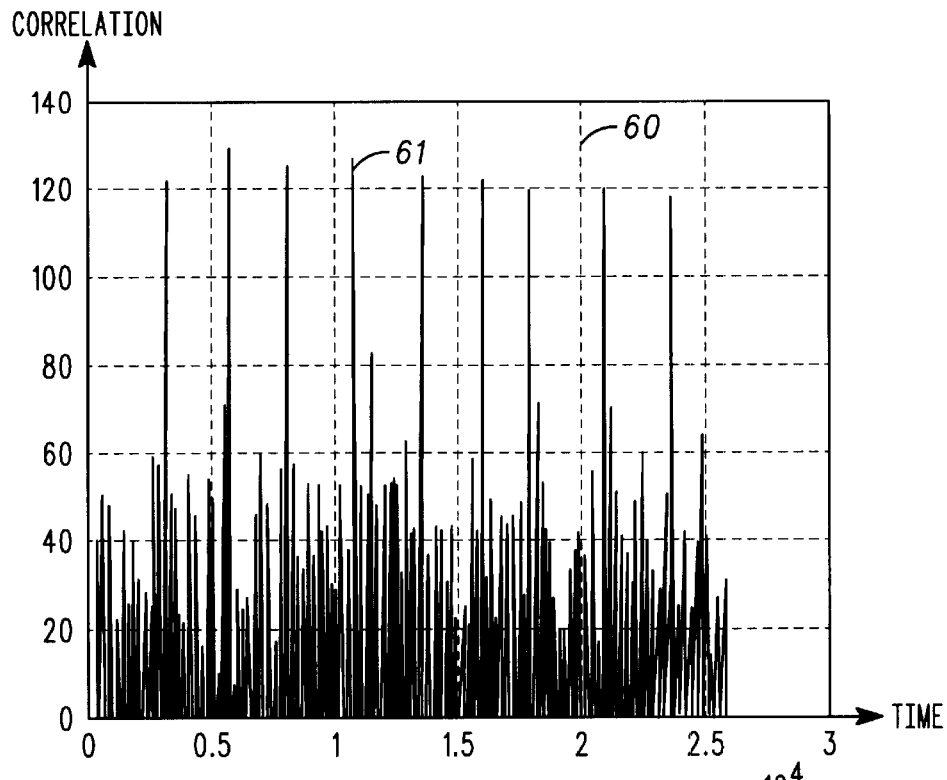
FIG. 5 is a curve showing an output of a correlation function of a training sequence, according to a preferred embodiment of the invention.

FIG. 5 shows the output of the correlation function. The X axis shows a correlation with absolute number and the Y axis shows the time. Curve 60 is a graphic presentation of the correlation function. A peaked curve 61 shows a result of the application of the correlation function to the training information received with the radio 36 and training information received from the memory 35.

Figure 6:
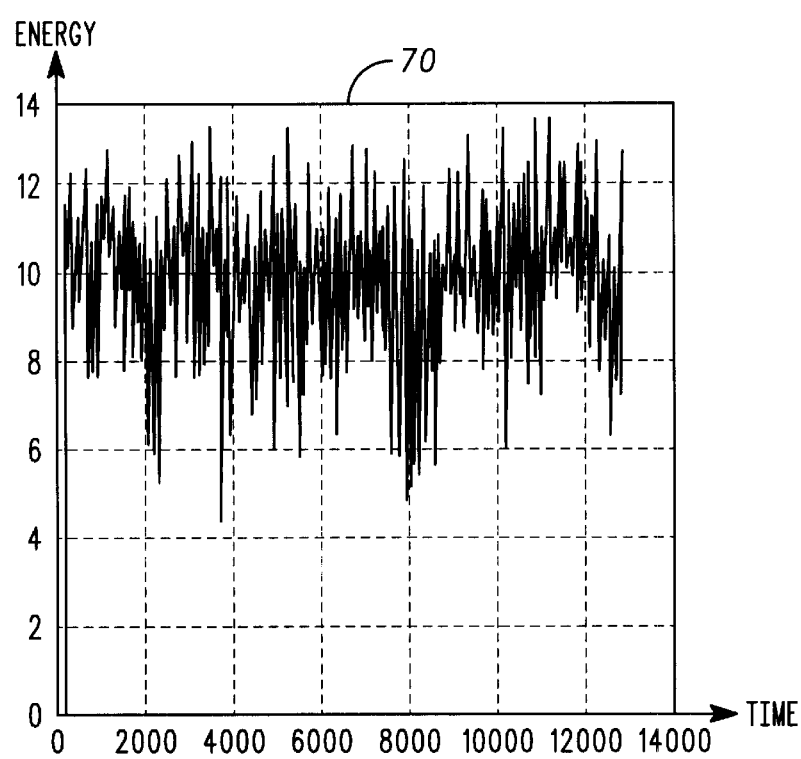
FIG. 6 is a curve showing the output of the energy function of incoming signals.
Figure 7:
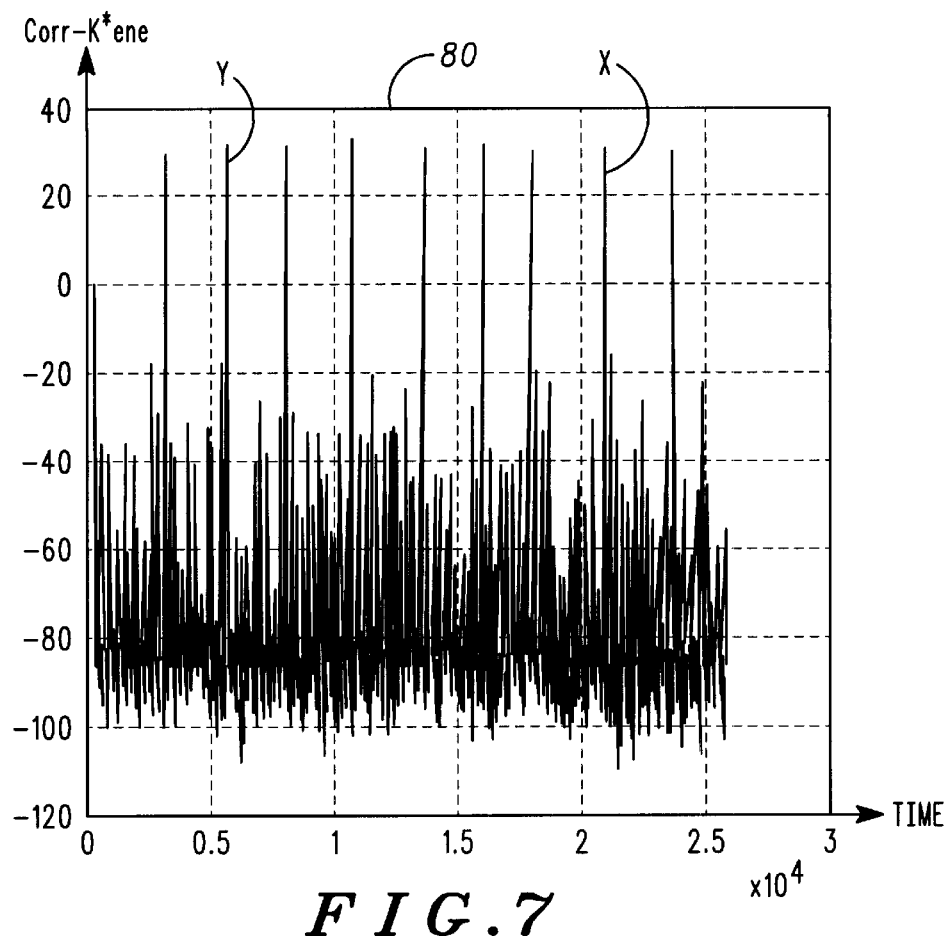
FIG. 7 is a curve showing the output of a function Corr −k*Ene of a training sequence.

FIG. 6 shows the output of the energy function. The X axis shows the energy of the detected symbol in terms of an absolute value and the Y axis shows time. Curve 70 is a graphic presentation of the energy function. The average value of curve 70 has a shape of a sine function and it is the same curve that has shown in FIG. 1*b* curve 19. After the correlation function and the energy has been computed, a third function r(n)=Corr(n)/Ene(n) will be computed. The output of this function will be described with reference to FIG. 7.

The X axis shows an Corr(n) –k*Ene(n) where k is a constant, and the Y axis shows time. Curve 80 is a graphic presentation of the Corr(n) –k*Ene(n) function. A peaked curve X and a peaked curves Y, shows a decoded symbol. Because the energy has not equal level throughout the incoming signal each decoded symbol has a different level of energy. The output of the blocks 24,25 and 26 are passed to blocks 27,28 and 29. For each block of training information, blocks 27,28 and 29 select the symbol with the highest peak that above the '0' line of curve 80. An example of such a symbol is the symbol marked as Y in curve 80. The output of blocks 27,28 and 29 are entered into block 30 for selection of the highest value symbol of all of the training information. The output of block 30, the symbol of the highest level is used to train the radio.

Figure 8:
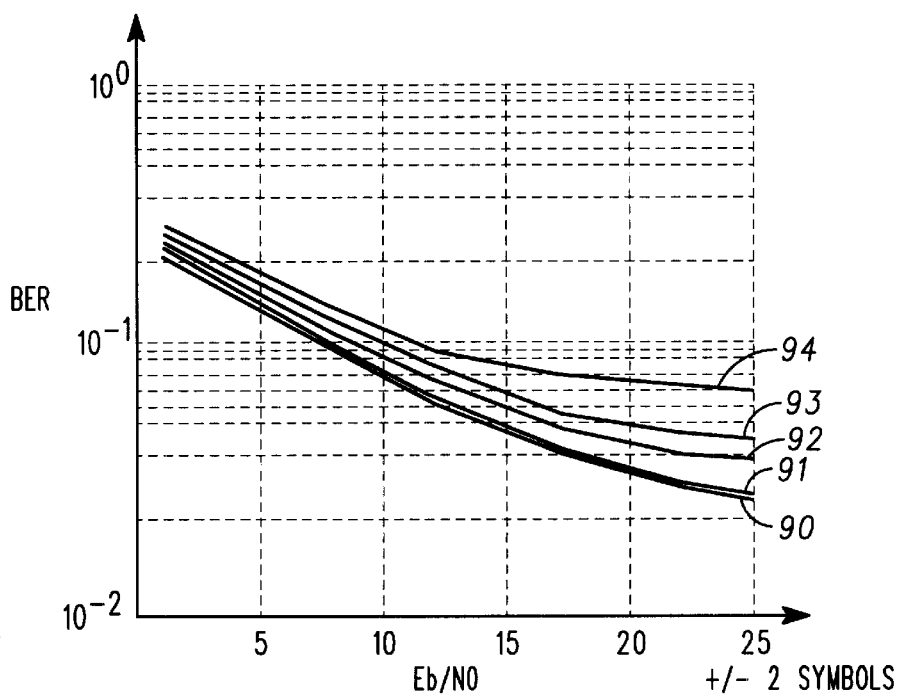
FIG. 8 is a curve showing the performance of the symbol time recovery, when a method in accordance with the invention is used to train a radio.

The advantages of the present invention will be described with reference to FIG. 8. FIG. 8 shows to a man skilled in the art that with the use of the present invention the Bit Error Rate (BER) performance of an HT200 channel condition that is defined in the TETRA standard as a channel with two Rayleigh fade with relative delay of 15 msec and average relative power of –8.6 dB is close to an ideal timing, curve 90. Curve 91 shows a Symbol Time Recovery (STR) based on two training sequence (Corr–Ene). Curve 91 shows the result of the uses of the present invention. The other curves shows the STR based on prior art algorithm such as Filter Sync algorithm based on two training sequence, curve 92, or based on one training sequence, curve 94, and the STR base on one training sequence using (Corr–Ene) an algorithm employing a function Corr–Ene.

In alternative embodiments of the invention, the method may use only two training sequences.

A brief description of two suitable training sequences will now be given. A first type T1 indicates that the received slot is a traffic slot that carries data and voice. A second type T2 indicates that the received slot is a stilling slot which is emergency slots that 'still' information from the traffic slot. The radio uses the training sequence information for identification of the slot type, to train the radio to synchronise with the receiving data and voice. Furthermore the radio uses the information for STR and for estimation of the next slot starting point.

Further symbols are derived using this method to provide a derived sequence of symbols. This is compared with a known sequence of symbols in order to adjust the timing of the radio in a manner well known in the art to synchronised the radio with the information received in the channel.

What is claimed is:

1. A method comprising the steps of:
    in a radio, receiving a first slot of information containing at least an initial portion containing training information, a second portion containing training information, which second portion is separated from the initial portion, and a concluding portion containing training information, which concluding portion is separated from the second portion;
    combining at least one of:
        the initial portion with the concluding portion of a previous slot of information; and the concluding portion of the first slot of information with an initial portion of a subsequent slot of information; to provide at least one combined portion of training information; and
    using the at least one combined portion of training information and the second portion of training information to train the radio.

2. A method as claimed in claim 1, wherein the initial portion of the first slot of information includes a first predetermined number of symbols of training information, the second portion of the first slot of information includes a second predetermined number of symbols of training information, and the concluding portion of the first slot of information includes a third predetermined number of symbols of training information.

3. The method of claim 2 wherein the initial portion and the concluding portion contain a training information of a first type and the second portion contains information from a second and third type.

4. The method of claim 2 wherein each of the symbols comprises two bits.

5. The method of claim 2 wherein the first predetermined number of symbols is 5, the second predetermined number is 11, and the third predetermined number is 6.

6. The method of claim 2 wherein the step of providing an at least one combined portion of training information comprises the step of providing an at least one combined portion having a number of symbols of training information that is equal to the second predetermined number of symbols.

7. A method as claimed in claim 6, wherein the an at least one combined portion has 11 symbols.

8. The method as claimed in claim 1 wherein the step of using the at least one combined portion of training information and the second portion of training information to train the radio comprises the step of comparing in a predetermined manner the second portion with the at least one combined portion.

9. The method as claimed in claim 8 wherein the step of comparing in a predetermined manner the second portion with the at least one combined portion comprises the steps of:
    computing for the second portion a first plurality of values that correspond to a calculated relationship between a correlation value and an energy value and selecting a first maximum value from amongst the first plurality of values;
    computing for the at least one combined portion a second plurality of values that correspond to a calculated relationship between a correlation value and an energy value and selecting a second maximum value from amongst the second plurality of values;
    comparing the first and second maximum values.

10. The method as claimed in claim 9 wherein the second plurality of values that correspond to a calculated relationship between a correlation value and an energy value comprises:
    at least one plurality of values computed for the at least one combined portion.

11. The method of claim 9 wherein the second maximum value from amongst the second plurality of values comprises:

a maximum value selected from at least one plurality of values of the second plurality of values.

12. A method of training a radio comprising, in a radio, the steps of:

receiving a first slot of information containing at least an initial portion containing a first predetermined number of symbols of training information, a second portion containing a second predetermined number of symbols of training information, which second portion is separated from the initial portion, and a concluding portion containing a third predetermined number of symbols of training information, which concluding portion is separated from the second portion, the initial portion and the concluding portion containing a training information of a first type and the second portion containing information from a second and third type;

combining at least one of:
the initial portion with the concluding portion of a previous slot of information; and the concluding portion of the first slot of information with an initial portion of a subsequent slot of information; to provide an at least one combined portion training information; and using the at least one combined portion of training information and the second portion of training information to train the radio.

13. The method of claim 12 wherein the first predetermined number of symbols is 5, the second predetermined number is 11, and the third predetermined number is 6.

14. The method of claim 12 wherein the step of providing an at least one combined portion of training information comprises the step of providing an at least one combined portion having a number of symbols of training information that is equal to the second predetermined number of symbols.

15. The method of claim 12 wherein each of the symbols comprises two bits.

16. The method of claim 15 wherein the step of providing an at least one combined portion of training information comprises the step of providing an at least one combined portion having a number of symbols of training information that is equal to the second predetermined number of symbols.

17. The method of claim 15 wherein the first predetermined number of symbols is 5, the second predetermined number is 11, and the third predetermined number is 6.

18. The method of claim 17 wherein the step of providing an at least one combined portion of training information comprises the step of providing an at least one combined portion having a number of symbols of training information that is equal to the second predetermined number of symbols.

19. A method of training a radio comprising, in a radio, the steps of:

receiving a first slot of information containing at least an initial portion containing training information, a second portion containing training information, which second portion is separated from the initial portion, and a concluding portion containing training information, which concluding portion is separated from the second portion, the initial portion and the concluding portion containing a training information of a first type and the second portion containing information from a second and third type;

combining at least one of:
the initial portion with the concluding portion of a previous slot of information; and the concluding portion of the first slot of information with an initial portion of a subsequent slot of information; to provide an at least one combined portion training information; and using the at least one combined portion of training information and the second portion of training information to train the radio.

20. The method of claim 19 wherein the step of providing an at least one combined portion of training information comprises the step of providing an at least one combined portion having a predetermined number of symbols of training information.

* * * * *